United States Patent [19]
Ozue

[11] Patent Number: 6,081,398
[45] Date of Patent: *Jun. 27, 2000

[54] RECORDING/REPRODUCING APPARATUS WITH READ-AFTER-WRITE CAPABILITY

[75] Inventor: Tadashi Ozue, Kanagawa, Japan

[73] Assignee: Sony Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/833,035

[22] Filed: Apr. 3, 1997

Related U.S. Application Data

[63] Continuation of application No. 08/392,348, Feb. 22, 1995, Pat. No. 5,684,649.

[30] Foreign Application Priority Data

Feb. 24, 1994 [JP] Japan ................................. 6-026538

[51] Int. Cl.⁷ .................................................. G11B 15/14
[52] U.S. Cl. .................................................. 360/64
[58] Field of Search ................................. 360/64, 61, 122

[56] References Cited

U.S. PATENT DOCUMENTS

| | | | |
|---|---|---|---|
| 5,155,641 | 10/1992 | Kubo et al. | 360/107 |
| 5,181,146 | 1/1993 | Koga | 360/64 |
| 5,341,248 | 8/1994 | Amada et al. | 360/84 |
| 5,383,063 | 1/1995 | Bannai et al. | 360/64 |
| 5,646,806 | 7/1997 | Griffith et al. | 360/130.22 |

*Primary Examiner*—Aristotelis M. Psitos
*Assistant Examiner*—Regina Y. Neal
*Attorney, Agent, or Firm*—Frommer Lawrence & Haug, LLP; William S. Frommer; Dennis M. Smid

[57] ABSTRACT

A rotary head recording/reproducing apparatus for recording and reproducing digital signals into and from helical tracks on a tape-like recording medium with a rotary head is disclosed. The apparatus comprises: a recording head section composed of first and second recording heads having different azimuth angles are closely located on a rotary drum; a first reproducing head section provided at 90° to the recording head section, the first reproducing head section being composed of first and second reproducing heads closely located, the first and second reproducing heads having azimuth angles corresponding to the first and second recording heads of the recording head section, respectively; and a second reproducing head section provided at 180° to the first reproducing head section, the second reproducing head section being composed of third and fourth reproducing heads closely located, the third and fourth reproducing heads having azimuth angles corresponding to the first and second recording heads of the recording head section, respectively.

9 Claims, 10 Drawing Sheets

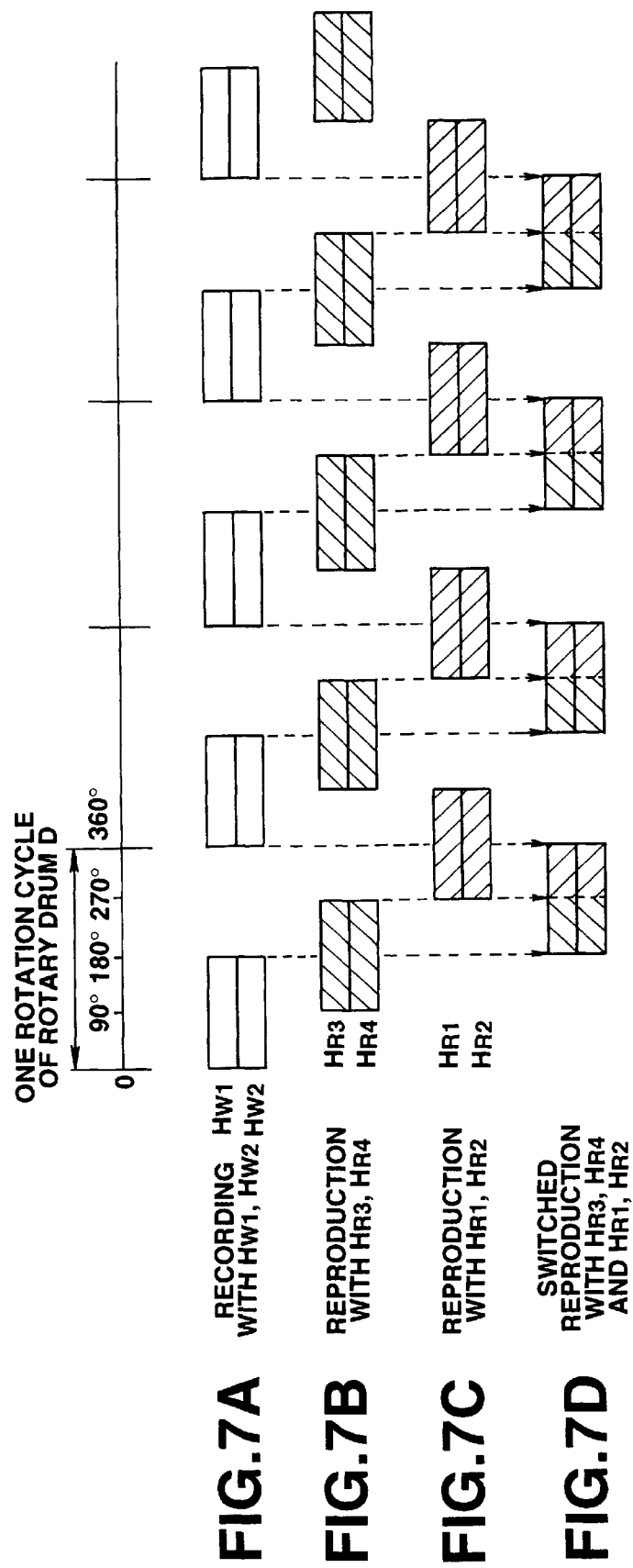

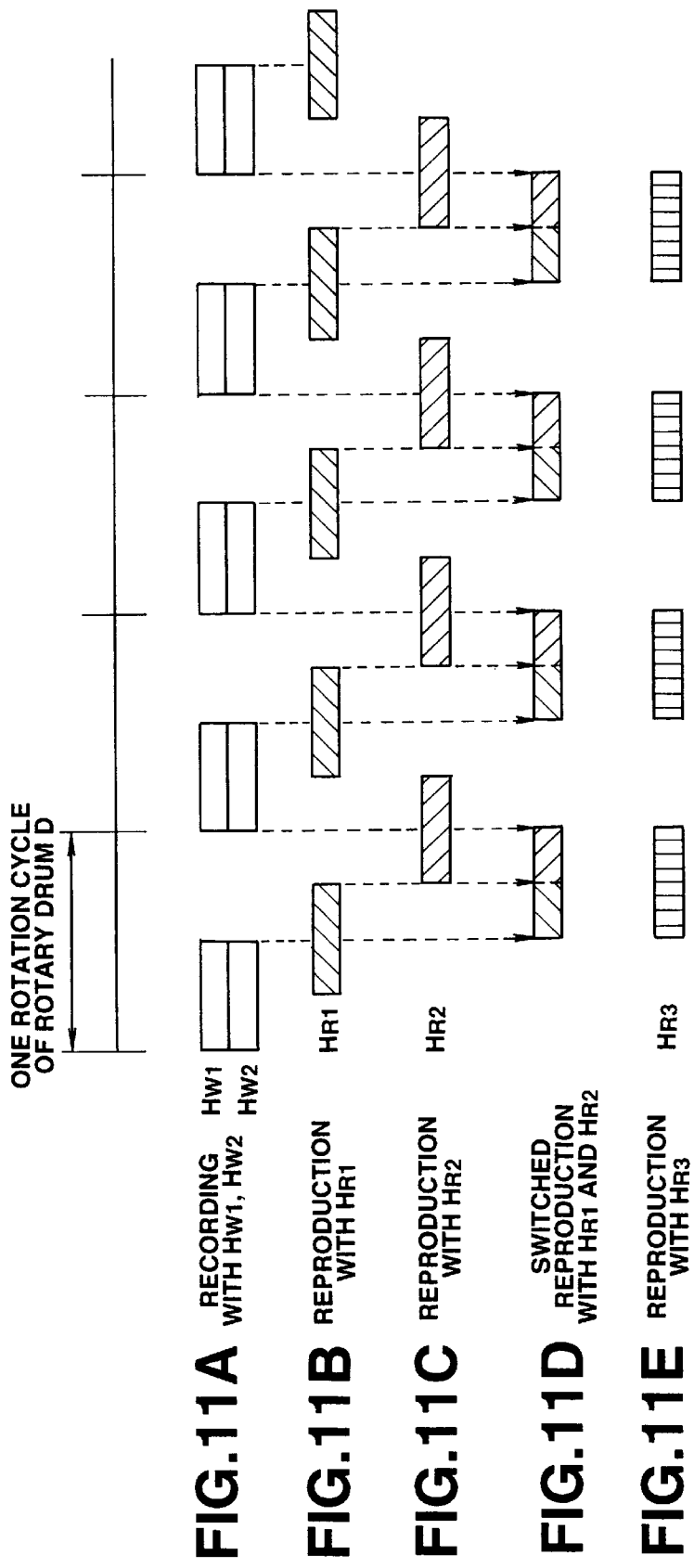

RECORDING/REPRODUCING APPARATUS WITH READ-AFTER-WRITE CAPABILITY

This application is a continuation of application Ser. No. 08/392,348, filed Feb. 22, 1995 now U.S. Pat. No. 5,684,649.

BACKGROUND OF THE INVENTION

This invention relates to a rotary head recording/reproducing apparatus for recording digital signals onto helical tracks on a tape-like recording medium and reproducing the digital signals therefrom with a rotary head rotating at a predetermined speed.

There has been known a rotary head recording/reproducing apparatus for recording/reproducing digital audio data, digital video data or analog video data with a rotary head onto/from a magnetic tape guided to run by cylindrical surface of the rotary drum.

In recording, the rotary head recording/reproducing apparatus records data onto a magnetic tape having no guard band, as shown in FIG. 1, with a recording magnetic head (hereinafter referred to as the recording head). That is, in this rotary head recording/reproducing apparatus, when the recording head helically scans the magnetic tape to repeatedly form tracks Ta and Tb having an inclination $\alpha$ for recording data, an azimuth angle of $+\theta$ in relation to the direction M perpendicular to the running direction L of the magnetic head is provided in the track Ta and an azimuth angle of $-\theta$ in relation to the direction M is provided in the track Tb. Thus, crosstalk between adjacent tracks is reduced.

It has been known that, in such azimuth recording, reproduction is carried out by using a reproducing magnetic head (hereinafter referred to as the reproducing head) to check whether data has been correctly recorded during one turn of the rotary drum. Such combination of recording with reproduction is called read-after-write (RAW). The rotary head recording/reproducing apparatus carries out RAW during one turn of the rotary drum.

An exemplary rotary head recording/reproducing apparatus for carrying out RAW during one turn of the rotary drum as described above has a rotary drum D in which recording heads $H_{W1}$, $H_{W2}$ are provided at 180° to face each other and in which reproducing heads $H_{R1}$, $H_{R2}$ are provided at 180° to face each other, as shown in FIG. 2. The recording head $H_{W1}$ and the reproducing head $H_{R1}$ are located at 90°. That is, in this rotary head recording/reproducing apparatus, the recording head $H_{W1}$, reproducing head $H_{R1}$, recording head $H_{W2}$ and reproducing head $H_{R2}$ are located on the rotary drum in this order each at an angle of 90°. In this rotary head recording/reproducing apparatus, a magnetic tape t is lapped about the rotary drum D at a lap angle of approximately 90°.

Another exemplary rotary head recording/reproducing apparatus for carrying out RAW during one turn of the rotary drum has a rotary drum D in which recording heads $H_{W1}$, $H_{W2}$ and reproducing heads $H_{R1}$, $H_{R2}$ are provided at an angle of 180°, as shown in FIG. 3. In this rotary head recording/reproducing apparatus, a magnetic tape t is lapped about the rotary drum D at a lap angle of approximately 180°.

In the rotary head recording/reproducing apparatus as shown in FIG. 3, the recording heads $H_{W1}$, $H_{W2}$ are integrally formed to have a double-azimuth structure with an extremely small gap between the two heads. The reproducing heads $H_{R1}$, $H_{R2}$ similarly form the double-azimuth structure. In addition, the azimuth angle of the closely provided heads differs to reduce crosstalk between adjacent tracks, as explained with reference to FIG. 1.

In both apparatuses shown in FIGS. 2 and 3, the magnetic tape t is fed at a constant speed by a capstan C and a pinch roller P, in the direction from a supply reel Rs to a takeup reel Rt (as indicated by an arrow N). The rotary drum D rotates in the direction indicated by an arrow O.

In the rotary head recording/reproducing apparatus as shown in FIG. 2, the reproduction heads $H_{R1}$, $H_{R2}$ do not carry out reproduction while the recording heads $H_{W1}$, $H_{W2}$ are carrying out recording. Therefore, reproduction is carried out when the recording heads $H_{W1}$, $H_{W2}$ do not operate, so that reproduction for checking in RAW can be carried out without causing any crosstalk from the recording system to the reproduction system.

Also in the apparatus as shown in FIG. 3, the reproducing heads $H_{R1}$, $H_{R2}$ do not carry out reproduction while the recording heads $H_{W1}$, $H_{W2}$ are carrying out recording. Therefore, reproduction is carried out when the recording heads $H_{W1}$, $H_{W2}$ do not operate, so that reproduction for checking in RAW can be carried out without causing any crosstalk from the recording system to the reproduction system.

With these rotary head recording/reproducing apparatuses, high-speed search can be realized by reading a search signal recorded on the track of the magnetic tape. Particularly, in the rotary head recording/reproducing apparatus, head search or search is carried out using a start ID, a program number and a time code as search signals. For example, though where the start ID indicating start of a program is recorded cannot be predicted during reproduction, the start ID can be securely read even in high-speed search in the rotary head recording/ reproducing apparatus.

Meanwhile, in the above-described high-speed search, the reproducing head helically transverses the recording track. Therefore, in the rotary head recording/reproducing apparatus as shown in FIG. 2, since the reproducing head $H_{R1}$ or the reproducing head $H_{R2}$ intermittently contacts the magnetic tape, as shown in FIG. 4, an area in which search signals cannot be read may be generated. That is, an area $A_0$ in which search signals cannot be read at all is generated between a readout area $A_{R1}$ corresponding to a locus $X_{R1}$ traced by the reproducing head $H_{R1}$ on the magnetic tape t and a readout area $A_{R2}$ corresponding to a locus $X_{R2}$ traced by the reproducing head $H_{R2}$. Thus, high-speed search is difficult unless search signals are recorded in the area of $A_{R1}$ $+A_0$.

Also, it is assumed that high-speed search at centuple speed is carried out in the rotary head recording/reproducing apparatus as shown in FIG. 3. In this case, the loci of the reproducing head $H_{R1}$ and the reproducing head $H_{R2}$ are indicated by $X_{R1}$ and $X_{R2}$, respectively, as shown in FIG. 5. Accordingly, the same search signal must be recorded in 200 or more tracks so that the search signal can be detected at a high speed.

As the search signal must be recorded in a number of tracks for realizing high-speed search, a recording area for main signals is reduced, disturbing improvement of recording density.

The rotation speed of the rotary drum D differs between cases of FIG. 2 and FIG. 3, with rotary drum D of FIG. 3 rotating at a higher speed.

Thus, plural reproducing heads need be provided at an equal distance on the rotary drum to efficiently read out the search signal recorded on tracks of the magnetic tape in high-speed search. However, as is described above, providing plural reproducing heads at an equal distance has limitation in consideration of crosstalk in RAW.

OBJECT AND SUMMARY OF THE INVENTION

In view of the above-described status of the art, it is an object of the present invention to provide a rotary head recording/reproducing apparatus which is capable of realizing reproduction for checking in RAW without causing crosstalk, efficiently reproducing search signals, and improving recording density of main signals in comparison with the conventional apparatus.

According to the present invention, there is provided a rotary head recording/reproducing apparatus for recording and reproducing digital signals into and from helical tracks on a tape-like recording medium with a rotary head, the apparatus having: a recording head section composed of first and second recording heads having different azimuth angles closely located on a rotary drum; a first reproducing head section provided at 90° to the recording head section, the first reproducing head section being composed of first and second reproducing heads closely located, the first and second reproducing heads having azimuth angles corresponding to the first and second recording heads of the recording head section, respectively; and a second reproducing head section provided at 180° to the first reproducing head section, the second reproducing head section being composed of third and fourth reproducing heads closely located, the third and fourth reproducing heads having azimuth angles corresponding to the first and second recording heads of the recording head section, respectively.

Also, the recording/reproducing apparatus has: a recording unit for periodically and simultaneously supplying recording signals to the first and second recording heads of the recording head section; an amplifying unit for amplifying reproduction signals from the first and second reproducing heads of the first reproducing head section and the third and fourth reproducing heads of the second reproducing head section; a first switching unit supplied with the reproduction signal from the first reproducing head and the reproduction signal from the third reproducing head, the first switching unit outputting one of the reproduction signal from the first reproducing head and the reproduction signal from the third reproducing head in a period during which the recording signals are not supplied to the first and second recording heads; and a second switching unit supplied with the reproduction signal from the second reproducing head and the reproduction signal from the fourth reproducing head, the second switching unit outputting one of the reproduction signal from the second reproducing head and the reproduction signal from the fourth reproducing head in a period during which the recording signals are not supplied to the first and second recording heads.

In addition, the recording/reproducing apparatus has: an encoding unit for encoding digital signals and supplying the encoded signals to the recording heads; and a decoding unit for decoding the reproduction signals from the first and second switching units.

According to the present invention, there is also provided a rotary head recording/reproducing apparatus for recording and reproducing digital signals into and from helical tracks on a tape-like recording medium with a rotary head, the apparatus having: a recording head section composed of first and second recording heads having different azimuth angles closely located on a rotary drum; a first reproducing head provided at 90° to the recording head section; a second reproducing head provided at 180° to the the recording head section; and a third reproducing head provided at 180° to the recording head section; the first reproducing head and the second reproducing head having the same azimuth angle as one of the first and second recording heads of the recording head section, the third reproducing head having the same azimuth angle as the other of the first and second recording heads of the recording head section.

Also, the recording/reproducing apparatus has: a recording unit for periodically and simultaneously supplying recording signals to the first and second recording heads of the recording head section; an amplifying unit for amplifying reproduction signals from the first, second and third reproducing heads; and a switching unit supplied with the reproduction signal from the first reproducing head and the reproduction signal from the second reproducing head, the switching unit outputting one of the reproduction signal from the first reproducing head and the reproduction signal from the second reproducing head in a period during which the recording signals are not supplied to the first and second recording heads.

Further, the recording/reproducing apparatus has: an encoding unit for encoding digital signals to generate recording signals to be supplied to the recording heads; and a decoding unit for decoding the reproduction signals from the switching unit and the third reproducing head.

In the present invention, the recording head section composed of two recording heads having different azimuth angles records signals onto every two tracks having different azimuth angles on the tape-like recording medium by rotation of the rotary drum at a predetermine speed. The first reproducing head section is provided at 90° to the recording head section, and is composed of two closely located reproducing heads corresponding to the azimuth angles of the two recording heads. The second reproducing head section is provided at 180° to the first reproducing head section, and is composed of two closely located reproducing heads corresponding to the azimuth angles of the two recording heads. That is, the reproducing head sections are located at an equal distance, with plural reproducing heads. Accordingly, reproduction for checking in RAW can be carried out without causing crosstalk, and search signals can be efficiently reproduced for high-speed search with high precision. In addition, recording density of main signals can be increased.

BRIEF DESCRIPTION OF THE DRAWINGS

FIG. 7 is a view for explaining RAW operation of the rotary head recording/reproducing apparatus of the first embodiment as shown in FIG. 6.

FIG. 11 is a view for explaining RAW operation of the rotary head recording/reproducing apparatus of the second embodiment as shown in FIG. 10.

DESCRIPTION OF THE PREFERRED EMBODIMENTS

Preferred embodiments of the rotary head recording/reproducing apparatus according to the present invention will now be described with reference to the attached drawings.

Figure 6:
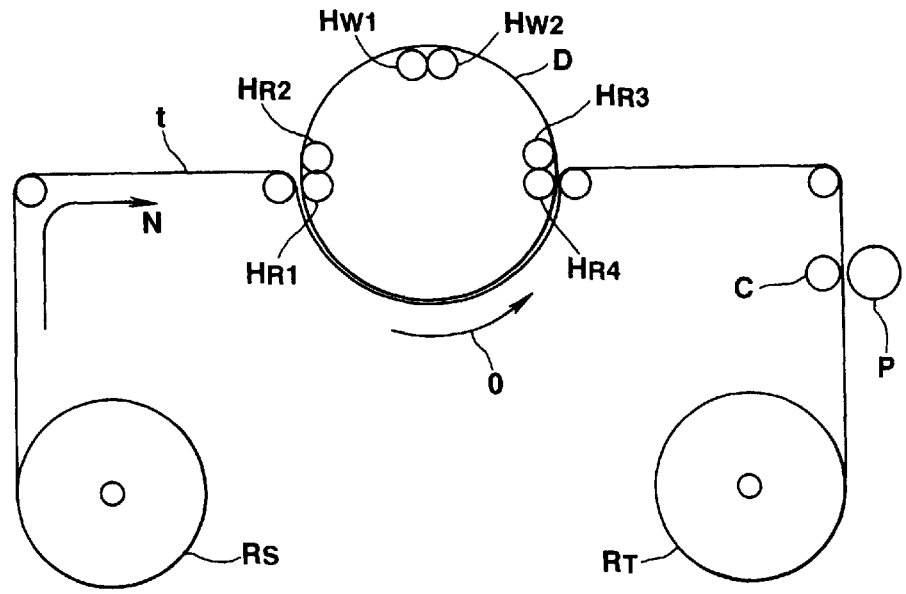
FIG. 6 is a view showing the rotary head recording/reproducing apparatus of a first embodiment of the present invention.

First, a rotary head recording/reproducing apparatus of a first embodiment has a recording head section composed of two recording magnetic heads (hereinafter referred to as recording heads) $H_{W1}$, $H_{W2}$, a first reproducing head section composed of two reproducing magnetic heads (hereinafter referred to as reproducing heads) $H_{R1}$, $H_{R2}$, and a second reproducing head section composed of two reproducing heads $H_{R3}$, $H_{R4}$, as shown in FIG. 6.

The two recording heads $H_{W1}$, $H_{W2}$ of the recording head section are provided with an extremely small gap between them on a rotary drum D. The recording head section has a double-azimuth head structure. The reproducing heads $H_{R1}$, $H_{R2}$ of the first reproducing head section are provided at 90° counterclockwise to the recording heads $H_{W1}$, $H_{W2}$ on the rotary drum D. The reproducing heads $H_{R3}$, $H_{R4}$ of the second reproducing head section are provided at 90° clockwise to the recording heads $H_{W1}$, $H_{W2}$ on the rotary drum D. Thus, the reproducing heads $H_{R1}$, $H_{R2}$ of the first reproducing head section are provided at 180° to the reproducing heads $H_{R3}$, $H_{R4}$ of the second reproducing head section on the rotary drum D. A magnetic tape t is lapped about the rotary drum D at a lap angle of approximately 180°, and is fed at a predetermined speed in a direction from a supply reel $R_S$ to a takeup reel $R_T$ (indicated by an arrow N in FIG. 6) by a capstan C and a pinch roller P. The rotary drum D rotates in a direction indicated by an arrow O.

Figure 1:
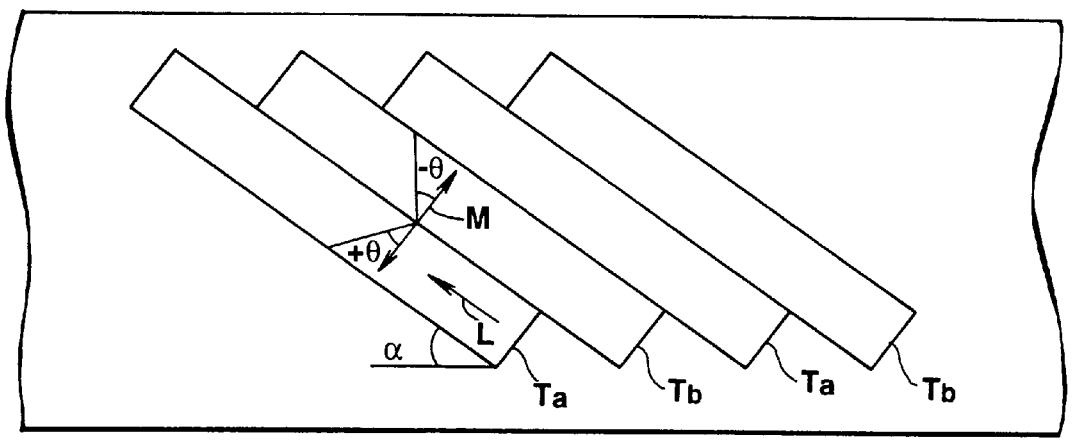
FIG. 1 is a view showing the structure of tracks formed on a magnetic tape with recording heads of different azimuth angles.
Figure 2:
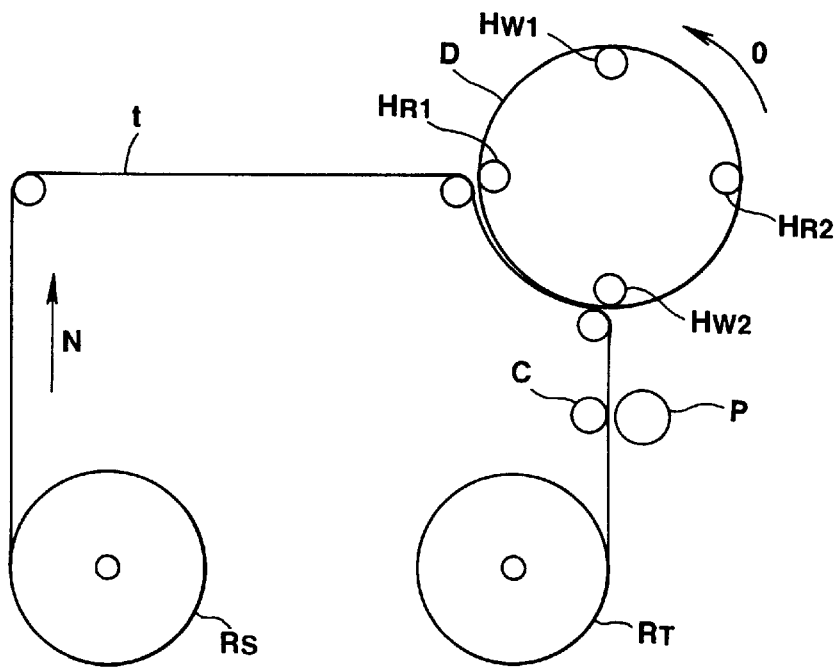
FIG. 2 is a view showing the structure of a conventional rotary head recording/reproducing apparatus.

The recording heads $H_{W1}$, $H_{W2}$ of the recording head section have different azimuth angles to reduce crosstalk between adjacent tracks, as shown in FIG. 1. As the two recording heads $H_{W1}$, $H_{W2}$ having different azimuth angles helically scan the magnetic tape t, two tracks Ta, Tb are formed on magnetic tape t, as shown in FIG. 1. The reproducing heads $H_{R3}$, $H_{R4}$ of the second reproducing head section and the reproducing heads $H_{R1}$, $H_{R2}$ of the first reproducing head section also have different azimuth angles corresponding to those of the recording heads $H_{W1}$, $H_{W2}$. That is, the reproducing head $H_{R1}$ and the reproducing head $H_{R3}$ have the same azimuth angle as that of the recording head $H_{W1}$. The reproducing head $H_{R2}$ and the reproducing head $H_{R4}$ have the same azimuth angle as that of the recording head $H_{W2}$.

Recording by the two recording heads $H_{W1}$, $H_{W2}$, and reproduction by the reproducing heads $H_{R1}$, $H_{R2}$ and $H_{R3}$, $H_{R4}$ located as described above in relation to the recording heads $H_{W1}$, $H_{W2}$ in RAW (read-after-write) will now be described with reference to FIGS. 7A to 7D.

FIG. 7A schematically shows data recorded onto the magnetic tape t by the two recording heads $H_{W1}$, $H_{W2}$ in one rotation cycle of the rotary drum D. FIG. 7B schematically shows data reproduced from the magnetic tape t by the two reproducing heads $H_{R3}$, $H_{R4}$ in one rotation cycle of the rotary drum D. FIG. 7C schematically shows data reproduced from the magnetic tape t by the two reproducing heads $H_{R1}$, $H_{R2}$ in one rotation cycle of the rotary drum D. FIG. 7D schematically shows data obtained by alternately switching outputs of the reproducing heads $H_{R3}$, $H_{R4}$ and the reproducing heads $H_{R1}$, $H_{R2}$.

In the recording operation, the two recording heads $H_{W1}$, $H_{W2}$ having different azimuth angles simultaneously carry out recording onto two helical tracks, as shown in FIG. 7A. In reproduction, the reproducing heads $H_{R1}$, $H_{R2}$ scan helical tracks at a timing shown in FIG. 7C, and the reproducing heads $H_{R3}$, $H_{R4}$ scan helical tracks at a timing shown in FIG. 7B. Thus, in the rotary head recording/reproducing apparatus of the first embodiment, reproduction signals can be outputted by switching output signals of the reproducing heads $H_{R3}$, $H_{R4}$ and the reproducing heads $H_{R1}$, $H_{R2}$ located at 180° at a timing shown in FIG. 7D, not duplicate with that of FIG. 7A. Therefore, reproduction can be carried out in a period during which the recording heads do not operate. Thus, reproduction for checking in RAW can be carried out without causing crosstalk.

Figure 8:
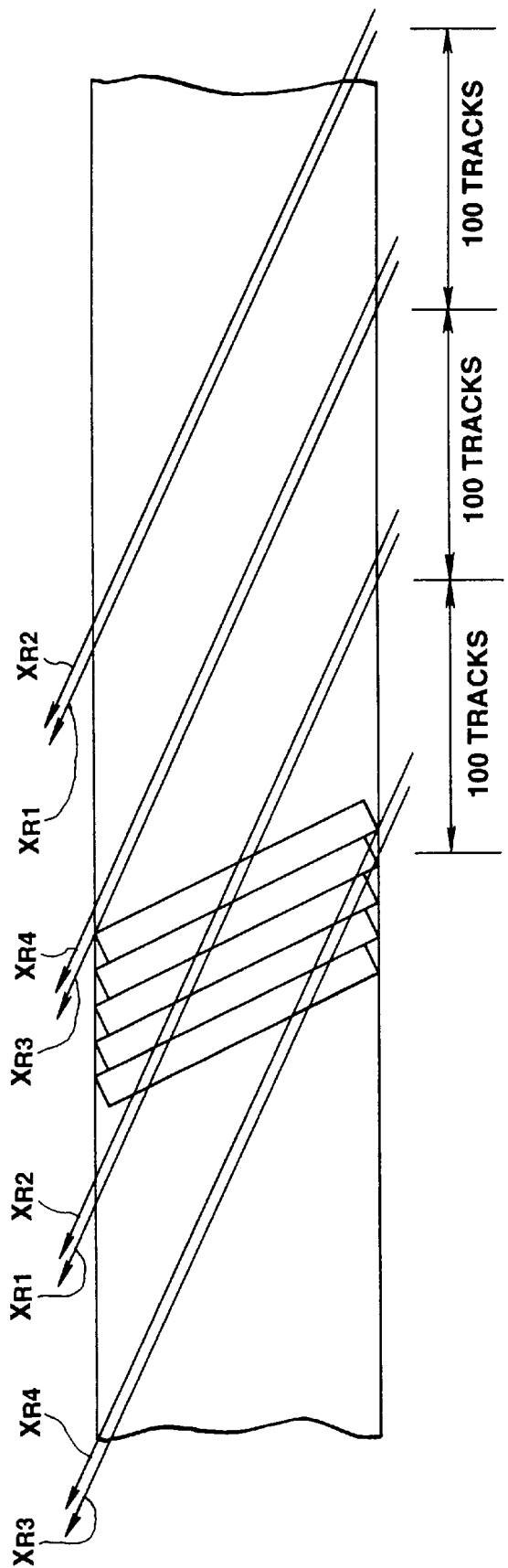
FIG. 8 is a view for explaining a search operation of the rotary head recording/reproducing apparatus of the first embodiment as shown in FIG. 6.

It is now assumed that high-speed search at centuple speed is carried out in the rotary head recording/reproducing apparatus of the first embodiment. In this case, loci of the reproducing heads $H_{R3}$, $H_{R4}$ and the reproducing heads $H_{R1}$, $H_{R2}$ are indicated by $X_{R3}$, $X_{R4}$ and $X_{R1}$, $X_{R2}$, respectively, as shown in FIG. 8. That is, in carrying out the centuple-speed search in the rotary head recording/reproducing apparatus of the first embodiment, it suffices to record the same search signal onto 100 tracks at maximum for efficient search.

A specific circuit structure of the above-described rotary head recording/reproducing apparatus having the rotary heads will be described with reference to FIG. 9. The rotary head recording/reproducing apparatus is composed of a recording system 10 and a reproduction system 20.

The recording system 10 is first explained.

Digital data supplied from a memory unit 101, such as a buffer RAM, through a small computer systems interface (SCSI) 1 and a buffer controller 2 are supplied to an error correction code (ECC) addition circuit 11. The ECC addition circuit 11 generates an error correction code, such as a parity code, and adds the resulting error correction code to the digital data. Output data of the ECC addition circuit 11 is supplied to a formatting circuit 12. The formatting circuit 12 receives the output data of the ECC addition circuit 11, a search signal, such as start ID, an error code, such as a pilot signal, and a clock signal, to generate recording data of predetermined track format corresponding to the recording heads $H_{W1}$, $H_{W2}$. Recording data for the recording head $H_{W1}$ generated by the formatting circuit 12 is modulated by an RF modulation circuit 13 into an RF signal to be supplied to the recording head $H_{W1}$ through a recording amplifier 14 and a rotary transformer, not shown. On the other hand, recording data for the recording head $H_{W2}$ generated by the formatting circuit 12 is modulated by an RF modulation circuit 15 into an RF signal to be supplied to the recording head $H_{W2}$ through a recording amplifier 16 and a rotary transformer, not shown. The recording heads $H_{W1}$, $H_{W2}$ simultaneously record data as magnetic signals onto the magnetic tape t.

The reproduction system 20 is now explained.

Data recorded as magnetic signals on the magnetic tape t are transformed into electric signals by the reproducing heads $H_{R1}$, $H_{R3}$, $H_{R2}$, $H_{R4}$, and are then amplified by reproduction amplifiers 21, 22, 31, 32, respectively. Reproduction signals from the reproduction amplifiers 21, 22 are fed to a changeover switch 23 where the reproduction signals are switchingly controlled. Reproduction signals from the reproduction amplifiers 31, 32 are fed to a changeover switch 33 where the reproduction signals are switchingly controlled. The changeover switches 23, 33 are supplied with switching pulses, respectively, for switchingly controlling the reproducing heads in response to rotation phase of the rotary drum D. For example, a switching pulse $SP_1$ supplied to the changeover switch 23 is a timing pulse for alternately arranging the output of the reproducing head $H_{R1}$ through the reproduction amplifier 21 and the output of the reproducing head $H_{R3}$ through the reproduction amplifier 22. A switching pulse $SP_2$ supplied to the changeover switch 33 is a timing pulse for alternately arranging the output of the reproducing head $H_{R2}$ through the reproduction amplifier 31 and the output of the reproducing head $H_{R4}$ through the reproduction amplifier 32.

An output signal from the changeover switch 23 is supplied to a detection system circuit 25 through an equalizer 24. This detection system circuit 25 carries out level discrimination by level comparison of the output signal from the equalizer 24, to reproduce data. The reproduced data from the detection system circuit 25 is supplied to a deformatting circuit 26. This deformatting circuit 26 deformats the data from the detection system circuit 25, to reproduce data of the data sequence in recording. The reproduced data is supplied to the ECC processing circuit 27. Meanwhile, an output signal from the changeover switch 33 is supplied to a detection system circuit 35 through an equalizer 34. Data from the detection system circuit 35 is supplied to a deformatting circuit 36. Data from this deformatting circuit 36 is also supplied to the ECC processing circuit 27.

The ECC processing circuit 27 carries out error correction using an error correction code on the data from the deformatting circuit 26 and the deformatting circuit 36. The data processed with error correction by the ECC processing circuit 27 are supplied to a memory 101, such as a buffer RAM, or a D/A converter, through a buffer controller 2 and a SCSI 1.

Figure 9:
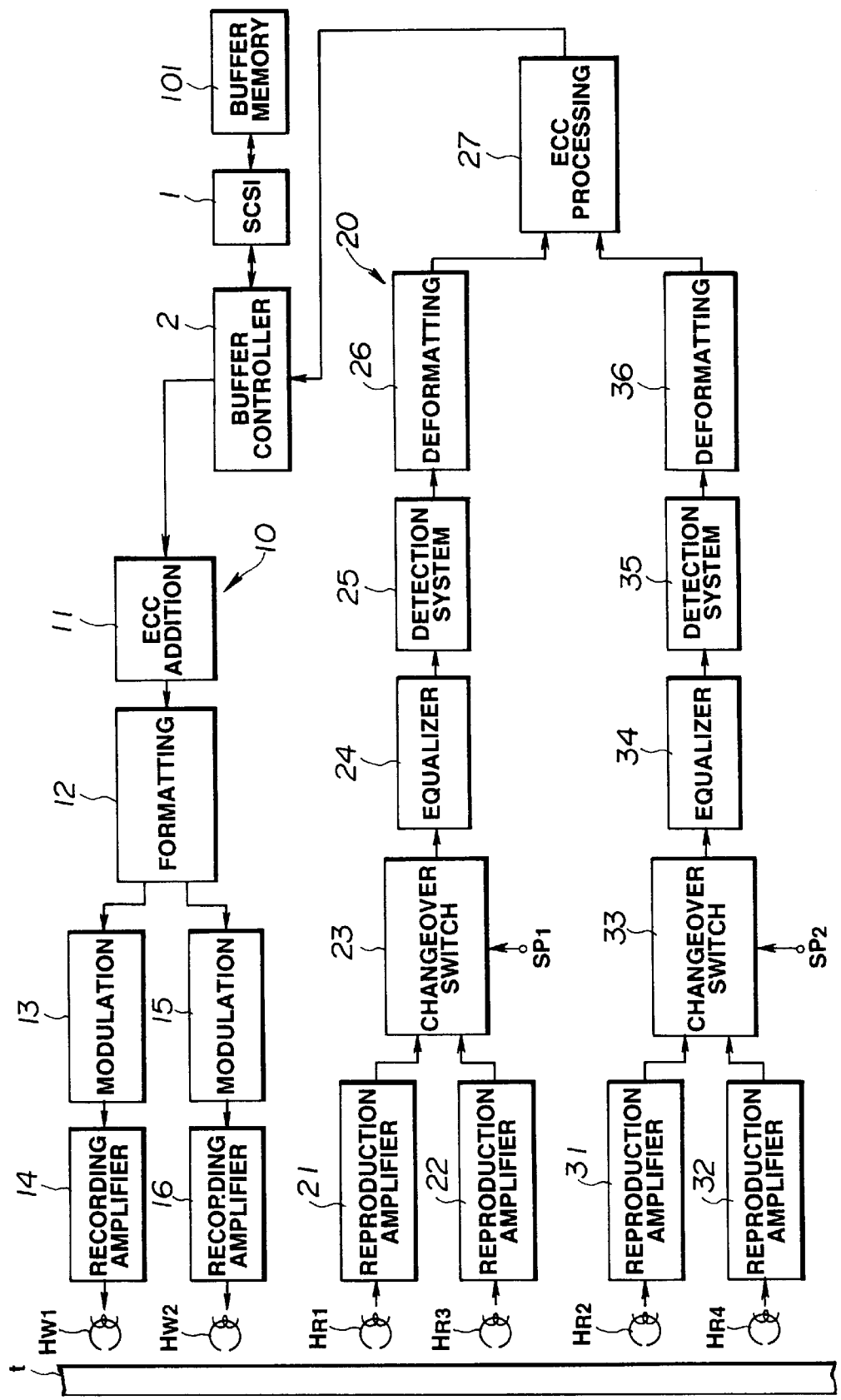
FIG. 9 is a block circuit diagram of the rotary head recording/reproducing apparatus of the first embodiment as shown in FIG. 6.

In the circuit structure shown in FIG. 9, the changeover switch 23 switches the reproduction signals from the reproducing heads $H_{R1}$, $H_{R3}$, and the changeover switch 33 switches the reproduction signals from the reproducing heads $H_{R2}$, $H_{R4}$. Thus, switched reproduction signals as shown in FIG. 7D can be obtained without causing crosstalk with the recording operation as shown in FIG. 7A.

Figure 3:
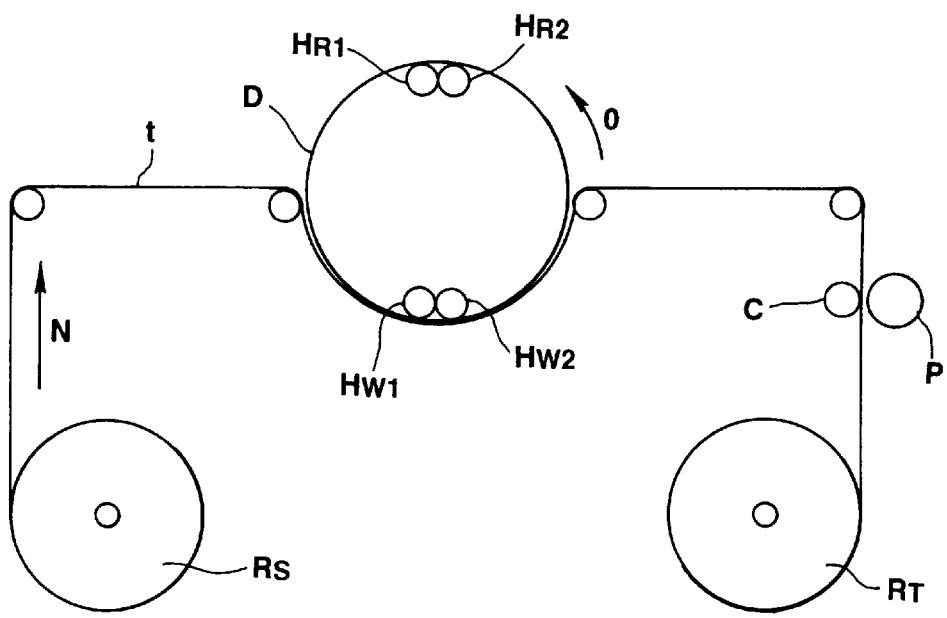
FIG. 3 is a view showing the structure of another conventional rotary head recording/reproducing apparatus.
Figure 4:
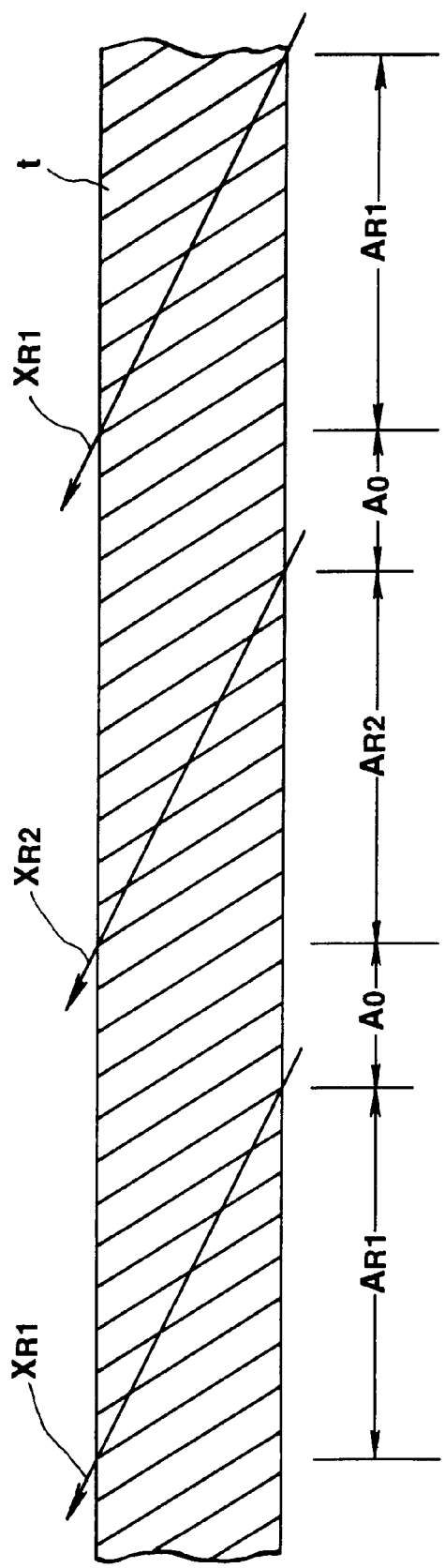
FIG. 4 is a view for explaining a search operation of the conventional rotary head recording/reproducing apparatus as shown in FIG. 2.
Figure 5:
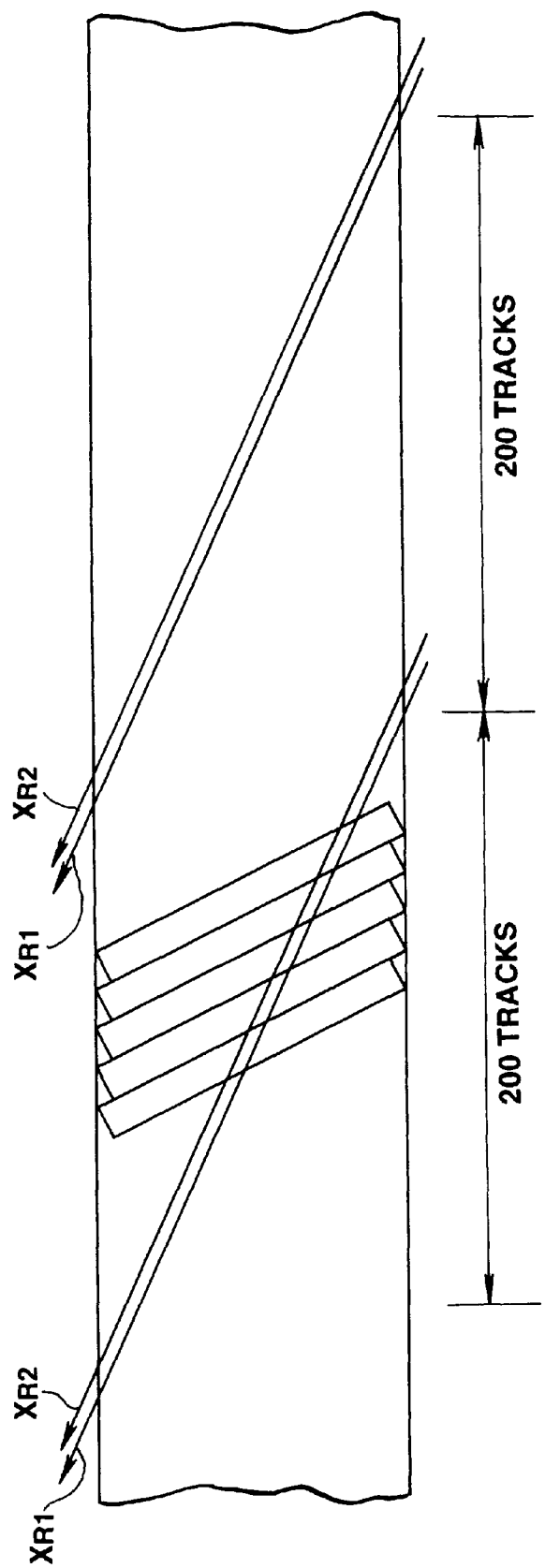
FIG. 5 is a view for explaining a search operation of the conventional rotary head recording/reproducing apparatus as shown in FIG. 3.

As is described above, the rotary head recording/reproducing apparatus of the first embodiment is capable of carrying out RAW without causing crosstalk. In addition, in comparison with the conventional rotary head recording/reproducing apparatus as shown in FIG. 3, the recording/reproducing apparatus of the first embodiment is capable of reducing writing of the same search signal, thus increasing recording of main signals and recording density.

Figure 10:
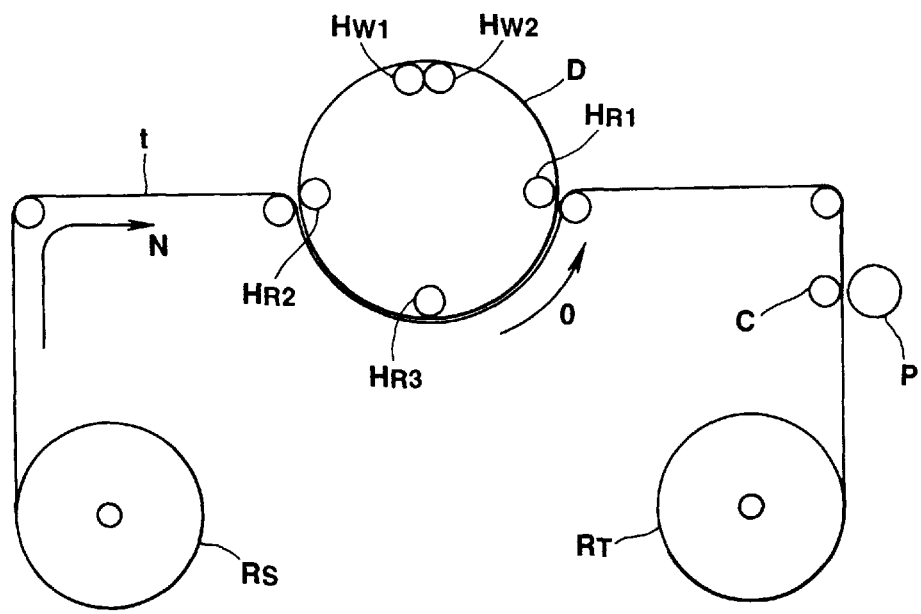
FIG. 10 is a view showing the structure of a rotary head recording/reproducing apparatus of a second embodiment of the present invention.

A rotary head recording/reproducing apparatus of a second embodiment has two recording heads $H_{W1}$, $H_{W2}$, and three reproducing heads $H_{R1}$, $H_{R2}$, $H_{R3}$, as shown in FIG. 10.

The two recording heads $H_{W1}$, $H_{W2}$ of a recording head section are provided with an extremely small gap between them on a rotary drum D, to have a double-azimuth head structure. The reproducing head $H_{R1}$ of a first reproducing head section is provided at 90° clockwise to the recording heads $H_{W1}$, $H_{W2}$. The reproducing head $H_{R2}$ of a second reproducing head section is provided at 180° to the reproducing head $H_{R1}$. In addition, the reproducing head $H_{R3}$ of a third reproducing head section is provided between the reproducing head $H_{R1}$ and the reproducing head $H_{R2}$, and at 180° to the recording heads $H_{W1}$, $H_{W2}$. A magnetic tape t is lapped about the rotary drum D at a lap angle of approximately 180°, and is fed at a predetermined speed in a direction from a supply reel $R_S$ to a takeup reel $R_T$ (indicated by an arrow N in FIG. 10) by a capstan C and a pinch roller P. The rotary drum D is rotated in a direction indicated by an arrow O.

The recording heads $H_{W1}$, $H_{W2}$, similar to those of the rotary head recording/reproducing apparatus of the first embodiment, have different azimuth angles to reduce crosstalk between adjacent tracks, as shown in FIG. 1. These two recording heads $H_{W1}$, $H_{W2}$ having different azimuth angles form two tracks Ta, Tb as shown in FIG. 1. Also, the reproducing heads $H_{R1}$, $H_{R2}$ have the same azimuth angle as that of the recording head $H_{W1}$, and the reproducing head $H_{R3}$ has the same azimuth angle as that of the recording head $H_{W2}$.

Recording by these two recording heads $H_{W1}$, $H_{W2}$ and reproduction by the three reproducing heads $H_{R1}$, $H_{R2}$, $H_{R3}$ will now be described with reference to FIGS. 11A to 11E.

FIG. 11A schematically shows data recorded onto the magnetic tape t by the two recording heads $H_{W1}$, $H_{W2}$ in one rotation cycle of the rotary drum D. FIG. 11B schematically shows data reproduced from the magnetic tape t by the reproducing head $H_{R1}$ in one rotation cycle of the rotary drum D. FIG. 11C schematically shows data reproduced from the magnetic tape t by the reproducing head $H_{R2}$ in one rotation cycle of the rotary drum D. FIG. 11D schematically shows data reproduced by switching an output of the reproducing head $H_{R1}$ and an output of the reproducing head $H_{R2}$ in one rotation cycle of rotary drum D. FIG. 11E schematically shows data reproduced from the magnetic tape t by the reproducing head $H_{R3}$ in one rotation cycle of the rotary drum D. By synthesizing data of FIGS. 11D and 11E, data can be reproduced at a timing not duplicate with that of FIG. 11A. Thus, in the rotary head recording/reproducing apparatus of the second embodiment, reproduction can be carried out when the recording heads do not operate. Therefore, reproduction for checking in RAW can be realized without causing crosstalk.

As the reproducing heads are provided in three positions in this rotary head recording/reproducing apparatus of the second embodiment, the apparatus is capable of reducing writing of the same search signal in comparison with the conventional rotary head recording/reproducing apparatus as shown in FIG. 3. Thus, recording of main signals and recording density can be increased.

Figure 12:
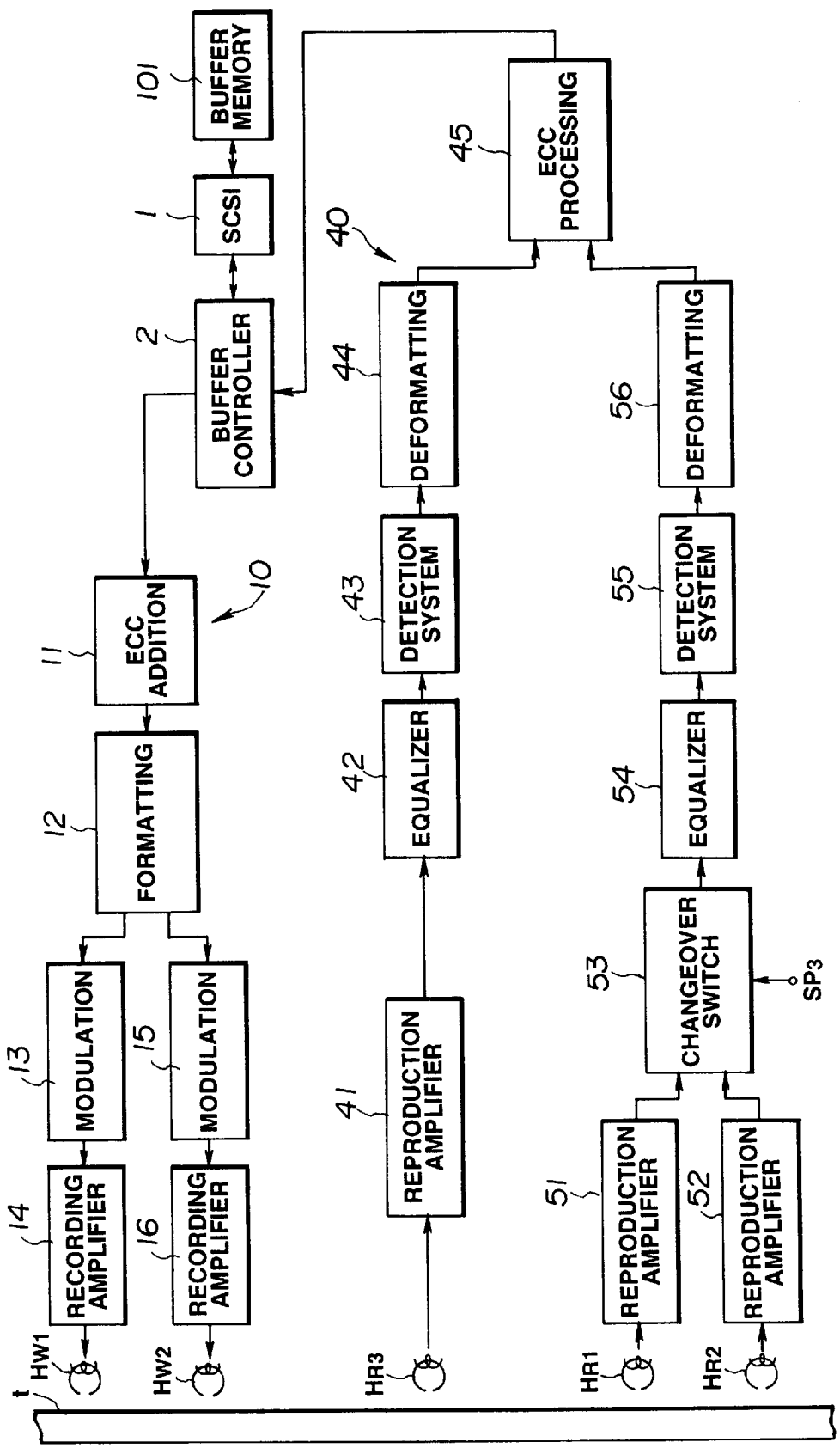
FIG. 12 is a block circuit diagram of the rotary head recording/reproducing apparatus of the second embodiment as shown in FIG. 10.

A circuit structure of the rotary head recording/reproducing apparatus of the second embodiment as described above will now be described with reference to FIG. 12. This rotary head recording/reproducing apparatus is composed of a recording system 10 and a reproduction system 40, as shown in FIG. 12. Since the recording system 10 has the structure identical to that of FIG. 9, the recording system 10 is denoted by the same reference numeral without further description.

The reproduction system 40 is now explained.

Data recorded as magnetic signals onto the magnetic tape t are transformed into electric signals by the reproducing heads $H_{R1}$, $H_{R2}$, and are then amplified by reproduction amplifiers 51, 52. Reproduction signals from the reproduction amplifiers 51, 52 are fed to a changeover switch 53 where the reproduction signals are switchingly controlled. The changeover switch 53 is supplied with a switching pulse for switchingly controlling the reproduction heads in response to rotation phase of the rotary drum D. For example, a switching pulse SP$_3$ supplied to the changeover switch 53 is a timing pulse for alternately arranging the output of the reproducing head H$_{R1}$ through the reproduction amplifier 51 and the output of the reproducing head H$_{R2}$ through the reproduction amplifier 52.

Output signals from the changeover switch 53 are supplied to a detection system circuit 55 through an equalizer 54. This detection system circuit 55 carries out level discrimination by level comparison of the output signal from the equalizer 54, to reproduce data. The reproduced data from the detection system circuit 55 is supplied to a deformatting circuit 56. This deformatting circuit 56 deformats the data from the detection system circuit 55, to reproduce data of data sequence in recording. The reproduced data is supplied to the ECC processing circuit 45.

On the other hand, reproduction signals from the reproducing head H$_{R3}$ are amplified by a reproduction amplifier 41, equalized by an equalizer 42, transformed into data by a detection system circuit 43, transformed into data of data sequence in recording by a deformatting circuit 44, and supplied to the ECC processing circuit 45.

The ECC processing circuit 45 carries out error correction using an error correction code on data from the deformatting circuit 44 and the deformatting circuit 56. Data processed with error correction by the ECC processing circuit 45 are supplied to a memory 101, such as a buffer RAM, or a D/A converter through a buffer controller 2 and a SCSI 1.

In the rotary head recording/reproducing apparatus as shown in FIG. 12, the changeover switch 53 switches reproduction signals from the reproducing heads H$_{R1}$, H$_{R2}$, to produce the switched reproduction signal as shown in FIG. 11D. By synthesizing the switched reproduction signal and the reproduction signal reproduced by the reproducing head H$_{R3}$ as shown in FIG. 11E, reproduction signals are obtained without generating crosstalk with the recording operation.

As is described above, RAW can be carried out without causing crosstalk in the rotary head recording/reproducing apparatus of the second embodiment. In addition, in comparison with the conventional rotary head recording/reproducing apparatus as shown in FIG. 10, the recording/reproducing apparatus of the second embodiment is capable of reducing writing of the same search signal, thus increasing recording of main signals and recording density.

The rotary head recording/reproducing apparatus according to the present invention, for recording and reproducing digital signals into and from helical tracks on a tape-like recording medium with a rotary head, has: a recording head section composed of first and second recording heads having different azimuth angles closely located on a rotary drum; a first reproducing head section provided at 90° to the recording head section, the first reproducing head section being composed of first and second reproducing heads closely located, the first and second reproducing heads having azimuth angles corresponding to the first and second recording heads, respectively, of the recording head section; and a second reproducing head section provided at 180° to the first reproducing head section, the second reproducing head section being composed of third and fourth reproducing heads closely located, the third and fourth reproducing heads having azimuth angles corresponding to the first and second recording heads, respectively, of the recording head section. Thus, the apparatus realizes reproduction for checking in RAW without causing crosstalk, efficient reproduction of search signals and improvement of recording density of main signals.

Also, the rotary head recording/reproducing apparatus according to the present invention, for recording and reproducing digital signals into and from helical tracks on a tape-like recording medium with a rotary head, has: a recording head section composed of first and second recording heads having different azimuth angles closely located on a rotary drum; a first reproducing head provided at 90° to the recording head section; a second reproducing head provided at 180° to the first reproducing head; and a third reproducing head provided at 180° to the first reproducing head; the first reproducing head and the second reproducing head having the same azimuth angle as one of the first and second recording heads of the recording head section, the third reproducing head having the same azimuth angle as the other of the first and second recording heads of the recording head section. Thus, the apparatus realizes reproduction for checking in RAW without causing crosstalk, efficient reproduction of search signals, high-speed search with high precision, and improvement of recording density of main signals.

What is claimed is:

1. A rotary head recording/reproducing apparatus for recording and reproducing digital signals onto and from helical tracks on a recording medium with a rotary head, the apparatus comprising:

only one recording head section having only two recording heads in which the first and second recording heads have different azimuth angles and are closely located to each other on a rotary drum for recording digital signals on alternating adjacent helical tracks;

a plurality of reproducing head sections comprised of at least first and second reproducing head sections on the rotary drum for reproducing recorded digital signals, said first reproducing head section being provided 90° from the recording head section on the rotary drum and being composed of first and seconds reproducing heads closely located to each other in which the first and second reproducing heads have azimuth angles corresponding to the respective azimuth angles of the first and second recording heads of the recording head section, and said second reproducing head section being provided 180° from the first reproducing head section on the rotary drum and being composed of third and fourth reproducing heads closely located to each other in which the third and fourth reproducing heads have azimuth angles corresponding to the respective azimuth angles of the first and second recording heads of the recording head section; and means for performing a read-after-write operation in which reproduced digital signals are obtained from the helical tracks of said recording medium, which is wrapped about the rotary drum for an angle of approximately 180 degrees, after the digital signals corresponding thereto have been recorded by the first and second recording heads of the recording head section and in which the obtained reproduced digital signals are outputted therefrom during a time period or periods in which the corresponding digital signals are not recorded and such that the digital signals recorded in the helical tracks in one rotation of the rotary drum and the reproduced digital signals obtained therefrom are acquired during a single rotation of the rotary drum.

2. A rotary head recording/reproducing apparatus for recording and reproducing digital signals onto and from helical tracks on a recording medium with a rotary head, the apparatus comprising:

a recording head section having only two recording heads in which the first and second recording heads have different azimuth angles and are closely located to each other on a rotary drum for recording digital signals on alternating adjacent tracks;

a plurality of reproducing head sections comprised of at least first and second reproducing head sections on the rotary drum for reproducing recorded digital signals in which the number of reproducing head sections is greater than the number of recording head sections, said first reproducing head section being provided 90° from the recording head section on the rotary drum and being composed of first and seconds reproducing heads closely located to each other in which the first and second reproducing heads have azimuth angles corresponding to the respective azimuth angles of the first and second recording heads of the recording head section, and said second reproducing head section being provided 180° from the first reproducing head section on the rotary drum and being composed of third and fourth reproducing heads closely located to each other in which the third and fourth reproducing heads have azimuth angles corresponding to the respective azimuth angles of the first and second recording heads of the recording head section;

recording means for periodically and simultaneously supplying recording signals to the first and second recording heads of the recording head section;

amplifying means for amplifying reproduction signals from the first and second reproducing heads of the first reproducing head section and the third and fourth reproducing heads of the second reproducing head section; and means for performing a read-after-write operation in which reproduced digital signals are obtained from said recording medium, which is wrapped about the rotary drum for an angle of approximately 180 degrees, after the digital signals corresponding thereto have been recorded by the first and second recording heads of the recording head section and in which the obtained reproduced digital signals are outputted therefrom during a time period or periods in which the corresponding digital signals are not recorded and such that the digital signals recorded in one rotation of the rotary drum and the reproduced digital signals obtained therefrom are acquired during a single rotation of the rotary drum, in which the read-after-write performing means includes first switching means supplied with the reproduction signals from the first and third reproducing heads for outputting one of the reproduction signal from the first reproducing head and the reproduction signal from the third reproducing head in a period during which the recording signals are not supplied to the first and second recording heads, and second switching means supplied with the reproducing signals from the second and fourth reproducing heads for outputting one of the reproduction signal from the second reproducing head and the reproduction signal from the fourth reproducing head in a period during which the recording signals are not supplied to the first and second recording heads.

3. The recording/reproducing apparatus as claimed in claim 2, further comprising:

encoding means for encoding digital signals and supplying the encoded signals to the recording heads; and decoding means for decoding the reproduction signals from the first and second switching means.

4. The recording/reproducing apparatus as claimed in claim 2, wherein said first switching means outputs a digital signal corresponding to a digital signal recorded on a track by said first recording head; and said second switching means outputs a digital signal corresponding to a digital signal recorded on a track by said second recording head.

5. The recording/reproducing apparatus as claimed in claim 2, wherein said first and third reproducing heads reproduce digital signals recorded on a track by said first recording head partly during a time when said first recording head records a digital signal on a track, and said second and fourth reproducing heads reproduce digital signals recorded on a track by said second recording head partly during a time when said second recording head records a digital signal on a track.

6. A rotary head recording/reproducing apparatus for recording and reproducing digital signals onto and from helical tracks on a tape-like recording medium with a rotary head, the apparatus comprising:

only one recording head section having only two recording heads in which the first and second recording heads have different azimuth angles and are closely located to each other on a rotary drum for recording digital signals on alternating adjacent first and second helical tracks;

a first reproducing head provided 90° from the recording head section on the rotary drum;

a second reproducing head provided 180° from the first reproducing head on the rotary drum;

a third reproducing head provided 180° from the recording head section on the rotary drum; and means for performing a read-after-write operation in which reproduced digital signals are obtained from the helical tracks of said recording medium, which is wrapped about the rotary drum for an angle of approximately 180 degrees, after the digital signals corresponding thereto have been recorded by the first and second recording heads of the recording head section and in which the obtained reproduced digital signals are outputted therefrom during a time period or periods in which the corresponding digital signals are not recorded and such that the digital signals recorded in the helical tracks in one rotation of the rotary drum and the reproduced digital signals obtained therefrom are acquired during a single rotation of the rotary drum;

the first reproducing head and the second reproducing head having the same azimuth angle as one of said first and second recording heads of the recording head section, the third reproducing head having the same azimuth angle as the other of said first and second recording heads of the recording head section.

7. A rotary head recording/reproducing apparatus for recording and reproducing digital signals onto and from helical tracks on a tape-like recording medium with a rotary head, the apparatus comprising:

a recording head section having only two recording heads in which the first and second recording heads have different azimuth angles and are closely located to each other on a rotary drum for recording digital signals on alternating adjacent first and second tracks;

a first reproducing head provided 90° from the recording head section on the rotary drum;

a second reproducing head provided 180° from the first reproducing head on the rotary drum;

a third reproducing head provided 180° from the recording head section on the rotary drum;

recording means for periodically and simultaneously supplying recording signals to the first and second recording heads of the recording head section;

amplifying means for amplifying reproduction signals from the first, second and third reproducing heads; and means for performing a read-after-write operation in which reproduced digital signals are obtained from said recording medium, which is wrapped about the rotary drum for an angle of approximately 180 degrees, after the digital signals corresponding thereto have been recorded by the first and second recording heads of the recording head section and in which the obtained reproduced digital signals are outputted therefrom during a time period or periods in which the corresponding digital signals are not recorded and such that the digital signals recorded in one rotation of the rotary drum and the reproduced digital signals obtained therefrom are acguired during a single rotation of the rotary drum;

in which the first reproducing head and the second reproducing head have the same azimuth angle as one of said first and second recording heads of the recording head section, and the third reproducing head has the same azimuth angle as the other of said first and second recording heads of the recording head section, and in which the read-after-write performing means includes switching means supplied with the reproduction signals from the first and second reproducing heads for outputting one of the reproduction signal from the first reproducing head and the reproduction signal from the second reproducing head in a period during which the recording signals are not supplied to the first and second recording heads.

8. The recording/reproducing apparatus as claimed in claim 7, further comprising:

encoding means for encoding digital signals to generate recording signals to be supplied to the recording heads; and decoding means for decoding the reproduction signals from the switching means and the third reproducing head.

9. The recording/reproducing apparatus as claimed in claim 7, wherein said first and second reproducing heads reproduce digital signals recorded on a track by said first recording head partly during a time when said first recording head records a digital signal on a track.

* * * * *